United States Patent
Oyama et al.

(10) Patent No.: US 6,746,509 B2
(45) Date of Patent: Jun. 8, 2004

(54) PROCESS FOR PRODUCING ZINC OR ZINC ALLOY POWDER FOR BATTERY

(75) Inventors: Akira Oyama, Yamaguchi (JP); Tadayoshi Odahara, Yamaguchi (JP); Seiji Fuchino, Yamaguchi (JP); Mitsuo Shinoda, Yamaguchi (JP); Hisaji Shimomura, Yamaguchi (JP)

(73) Assignees: Mitsui Mining & Smelting Company, Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/238,858

(22) Filed: Sep. 11, 2002

(65) Prior Publication Data

US 2004/0045404 A1 Mar. 11, 2004

(51) Int. Cl.[7] .................................................. B22F 9/08
(52) U.S. Cl. ............................... 75/337; 75/338; 75/339
(58) Field of Search ........................... 75/337, 338, 339

(56) References Cited

U.S. PATENT DOCUMENTS 4,606,869 A * 8/1986 Showak ........................ 264/12
6,398,125 B1 * 6/2002 Liu et al. ....................... 239/13

FOREIGN PATENT DOCUMENTS

| JP | A-48-37357 | 6/1973 |
| JP | A 62-290806 | 12/1987 |
| JP | A 1-246306 | 10/1989 |
| JP | A 8-291307 | 11/1996 |
| JP | A 9-235636 | 9/1997 |
| JP | A 11-176435 | 7/1999 |
| JP | A 2001-351622 | 12/2001 |
| JP | 2002-047505 A | * 2/2002 |
| JP | 2002-146411 A | * 5/2002 |

* cited by examiner

*Primary Examiner*—George Wyszomierski
(74) *Attorney, Agent, or Firm*—Young & Thompson

(57) ABSTRACT

A process of producing a zinc or zinc alloy powder (4) for batteries which comprises dropping molten zinc or a molten zinc alloy to form a molten metal droplets stream (1) and striking an atomizing medium jet (3) emitted from a nozzle (2) against the molten metal stream (1) at right angles to atomize the molten zinc or the molten zinc alloy, wherein two or more the nozzles are arranged in parallel to each other, the orifice of each of the nozzles has a V-shaped, U-shaped, X-shaped or arc-shaped cross-section, the atomizing medium is air or an inert gas, two or more the molten metal streams have at least two different flow rates selected from a range 0.04 to 0.25 kg/sec, and two or more the atomizing medium jets have at least two different atomizing pressures selected from a range 4 to 9 kg/cm$^2$.

5 Claims, 2 Drawing Sheets

PROCESS FOR PRODUCING ZINC OR ZINC ALLOY POWDER FOR BATTERY

BACKGROUND OF THE INVENTION

1. Field of the Invention

The present invention relates to a process for producing zinc or zinc alloy powder for batteries. More particularly, it relates to a process for producing zinc or zinc alloy powder for batteries as a well-balanced mixture of fine powder and coarse powder which exhibits satisfactory workability in gelation and acquires satisfactory gel viscosity, ensures excellent battery characteristics with reduced gas evolution when used in batteries, and can be produced in large quantity in good yield.

2. Description of Related Art

Zinc or zinc alloy powder for use in batteries, especially as an anode active material of alkaline batteries, has been produced by gas atomization in which molten zinc or zinc alloy is atomized by an air jet or an inert gas jet.

In carrying out gas atomization, zinc or a zinc alloy material is melted in a melting furnace, and a predetermined amount of the molten metal is dropped in a stream. The stream of falling molten metal droplets is struck at right angles by an atomizing gas jet emitted from a nozzle exit and broken up into particles, which are collected. The orifice of the nozzle usually used in gas atomization has a circular or annular cross-section. Air has been frequently used as an atomizing gas. Zinc or zinc alloy powders produced by the gas atomization generally comprise 20 to 200 mesh particles in a proportion of about 75% by weight.

With the recent rapid development of digitization, the demand for higher-rate alkaline batteries has been growing, and further improvement on activation of zinc or zinc alloy powder by particle size reduction has been required accordingly. On the other hand, it is required for the zinc or zinc alloy powder to contain coarse particles greater than a certain size from the standpoint of workability in gelation, the resultant gel viscosity, and suppression of gas evolution within batteries. For these reasons, it has been demanded to establish a technique suited to commercial production of a zinc or zinc alloy powder comprising coarse particles and fine particles in a given ratio and satisfying the performance requirements described above.

Zinc or zinc alloy powders having a prescribed particle size distribution have been obtained by classifying gas-atomized powders into fractions according to size and mixing the fractions. However such classification and mixing operations are extremely inefficient, contributing to poor yield and poor productivity.

SUMMARY OF THE INVENTION

An object of the present invention is to provide a process of producing a zinc or zinc alloy powder for batteries which can yield a powder containing fine particles and coarse particles in arbitrary amounts in a good balance, exhibiting satisfactory workability in gelation and satisfactory gel viscosity, and, in batteries, manifesting excellent battery characteristics and suppressing gas evolution and which realizes large volume production with good yield.

As a result of extensive investigation, the present inventors have found that the above object is accomplished by carrying out a gas atomizing process for producing a zinc or zinc alloy powder by using a plurality of nozzles arranged in parallel with each other and optimizing the molten metal flow rate and the atomizing pressure for each nozzle.

Completed based on the above finding, the present invention provides a process of producing a zinc or zinc alloy powder for batteries which comprises dropping molten zinc or a molten zinc alloy to form a stream of molten metal droplets and striking a jet of an atomizing medium emitted from the orifice of a nozzle against the molten metal stream at right angles to atomize the molten zinc or the molten zinc alloy, wherein two or more the nozzles are arranged in parallel to each other, the orifice of each of the nozzles has a V-shaped, U-shaped, X-shaped or arc-shaped cross-section, the atomizing medium is air or an inert gas, two or more the molten metal streams have at least two different flow rates selected from a range of from 0.04 to 0.25 kg/sec, and two or more the jets of the atomizing medium have at least two different atomizing pressures selected from a range of from 4 to 9 kg/cm$^2$.

BRIEF DESCRIPTION OF THE DRAWINGS

The present invention will be more particularly described with reference to the accompanying drawings, in which.

DESCRIPTION OF THE PREFERRED EMBODIMENTS

Figure 1:
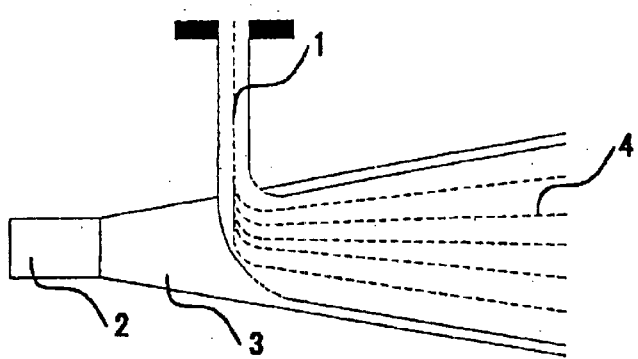
FIG. 1 shows a stream of molten zinc or zinc alloy droplets being atomized by a jet of an atomizing medium from a nozzle according to the process of the present invention.

Embodiments of the present invention will be described with reference to the accompanying drawings. FIG. 1 is a cross-sectional view showing a stream of molten zinc or zinc alloy droplets being broken up into atomized powder by an atomizing medium jet from a nozzle. In FIG. 1, numeral 1 denotes a molten zinc or zinc alloy stream, numeral 2 denotes a nozzle, numeral 3 denotes an atomizing medium jet and numeral 4 denotes atomized powder respectively.

A zinc or zinc alloy (hereinafter sometimes inclusively referred to as metal) material is put into a melting furnace and melted into a molten metal. The molten metal is dropped through an orifice of given size at a predetermined flow rate to make a molten metal stream 1. The flow rate is adjusted by the orifice diameter. Flow rates lower than 0.04 kg/sec can cause clogging of the orifice. Flow rates higher than 0.25 kg/sec tend to make normal atomization difficult.

An atomizing medium is emitted from the orifice of the nozzle 2 into an atomizing medium jet 3, which strikes against the molten metal stream 1 at right angles to break up the stream 1 into atomized metal powder 4.

The atomizing medium which can be used in the present invention includes air and inert gases, such as nitrogen and argon. The atomizing pressure should range from 4 to 9 kg/cm$^2$ for obtaining powder in high yield. With the molten metal flow rate being in a general range, atomizing pressures lower than 4 kg/cm² result in instable atomization and poor yield. Atomizing pressures higher than 9 kg/cm² result in production of very fine particles and make it difficult to adjust the nozzle position for obtaining stable atomizing.

Figure 2:
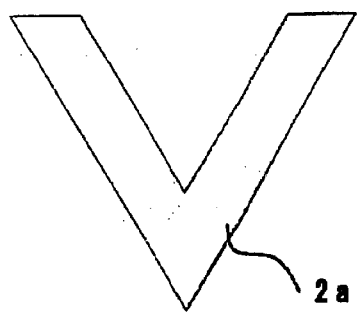
FIG. 2 is a cross-section of a V-shaped orifice of a nozzle used in the present invention.
Figure 3:
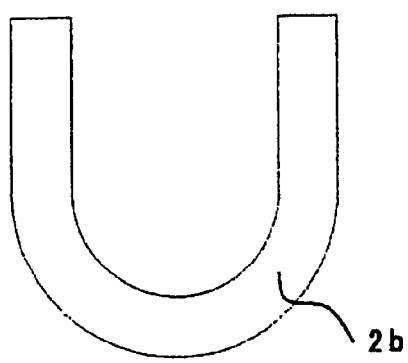
FIG. 3 is a cross-section of a U-shaped orifice of a nozzle used in the present invention.
Figure 4:
FIG. 4 is a cross-section of an arc-shaped orifice of a nozzle used in the present invention.

The cross-section of the orifice of the nozzle 2 used in the present invention should have a V shape (2a of FIG. 2), a U shape (2b of FIG. 3), an X shape (now shown), or an arc shape (2c of FIG. 4). Nozzles 2 with such a specific orifice cross-section are successful for efficient atomization of molten metal.

Figure 5:
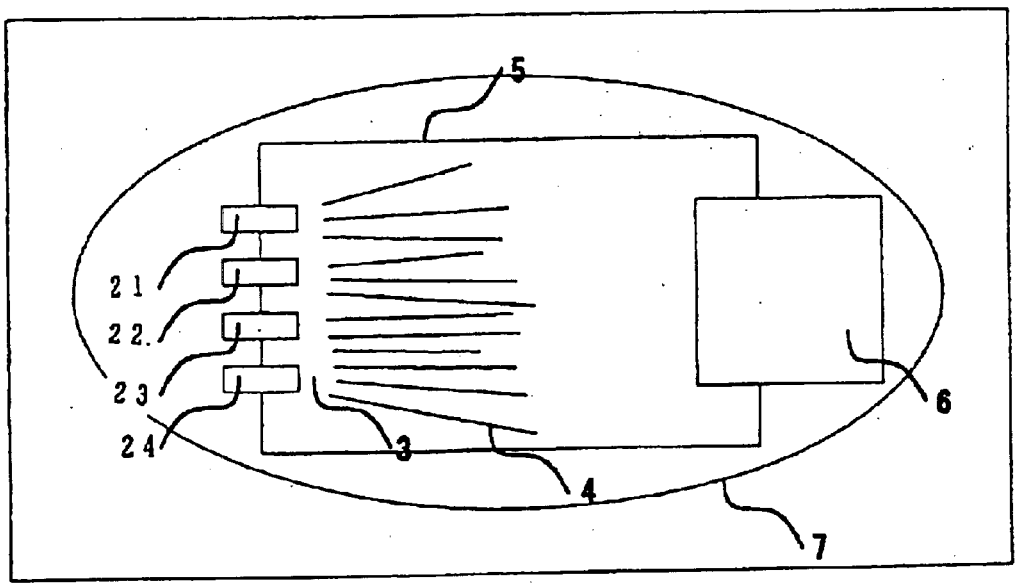
FIG. 5 is a plan of an atomizing chamber used in the process of the present invention.

As shown in FIG. 5, the gas atomization is effected with two or more, preferably three or four, nozzles 2 (21 to 24) that are arranged in a parallel configuration. It is preferred that three or four nozzles 2 be arranged in parallel on the same plane. Use of a plurality of the nozzles 2 in such a configuration makes it feasible to produce atomized powder efficiently and stably on a large production scale.

In the gas atomizing process according to the present invention, the two or more molten metal streams have at least two different flow rates selected from a range of from 0.04 to 0.25 kg/sec, and the two or more jets of the atomizing medium have at least two different atomizing pressures selected from a range of from 4 to 9 kg/cm². In an example, the atomizing pressures of the nozzles 21 and 22 are set low within the above-specified range of 4 to 9 kg/cm² (e.g., selected from a range less than 6 kg/cm²), while those of the nozzles 23 and 24 are set high within the range of 4 to 9 kg/cm (e.g., selected from a range of 6 kg/cm² and higher); and the flow rate of the molten metal at the nozzle 21 is set low within the above-specified range of 0.04 to 0.25 kg/sec (e.g., selected from a range of 0.16 kg/sec and lower), while the flow rates of the molten metal streams at the nozzles 22, 23 and 24 are set high within the range 0.04 to 0.25 kg/sec (e.g., selected from a range of 0.09 kg/sec and higher). If necessary, the distances from the nozzle exits to the molten metal streams are adjusted.

In the example shown supra, the nozzle 21 coupled with a molten metal stream having a lower flow rate produces powder in a smaller amount, whereas the nozzles 22 to 24 coupled with molten metal streams having higher flow rates produce powder in larger amounts; and the nozzles 21 and 22 having lower atomizing pressures predominantly produce coarse particles of +100 mesh, while the nozzles 23 and 24 having higher atomizing pressures predominantly produce fine particles of −200 mesh. As a result, coarse particles and fine particles are produced simultaneously in arbitrary quantities, and the product exhibits stable quality in terms of mixing properties of the coarse and the fine particles.

The two or more nozzles may have two or more different cross-sections at their orifices (exits). For example, the orifices of the nozzles 21 and 22 may have a V-shaped cross-section (2a of FIG. 2), while the orifices of the nozzles 23 and 24 may have a U-shaped cross-section (2b of FIG. 3). Use of nozzles with different cross-sections at their exits makes it possible to control the particle size distribution of the resulting powder more precisely.

The inner atmosphere of the atomizing chamber 7, in which the molten metal is broken up into atomized powder 4, is maintained under positive pressure by introducing clean air through a high performance filter 6. By maintaining the inner atmosphere of the atomizing chamber in a clean state under positive pressure, incorporation of impurity into the atomized powder 4 is prevented, and gas evolution is suppressed when the resulting zinc or zinc alloy powder is used as an anode active material of a battery. In FIG. 5, numeral 5 indicates a chamber.

The atomized powder thus obtained contains particles of −200 mesh in a proportion of 20 to 70% by weight and comprises arbitrary amounts of fine powder and coarse powder in a good balance. A zinc or zinc alloy powder having such a well-balanced particle size distribution exhibits satisfactory workability in gelation to acquire satisfactory gel viscosity or like characteristics. While used in a battery as an anode active material, it manifests excellent battery characteristics and suppresses gas evolution. The process of the present invention makes it feasible to produce zinc or zinc alloy powder with these characteristics in good yield.

Figure 6:
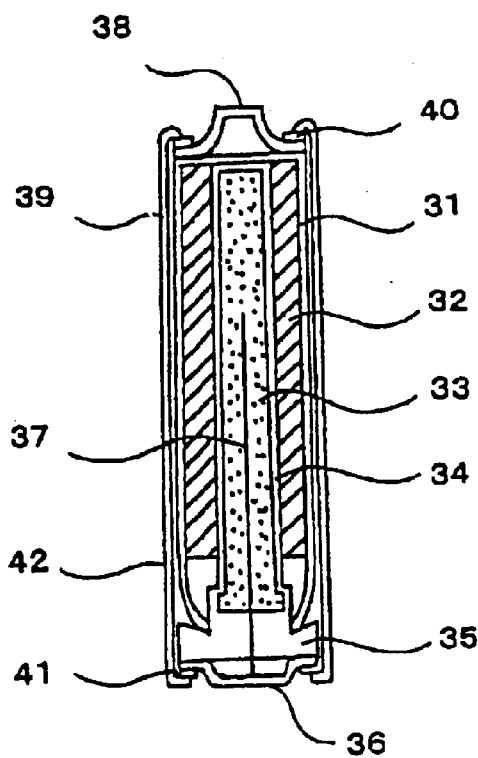
FIG. 6 is a schematic cross-section of an alkaline battery in which a zinc or zinc alloy powder obtained by the process of the present invention is used as an anode active material.

In FIG. 6 is shown a schematic cross-sectional view of an alkaline battery, to which the zinc or zinc alloy powder obtained by the process of the present invention is applied as an anode active material. The alkaline battery of FIG. 6 comprises a cathode case 31, a cathode 32, an anode (gelled zinc or zinc alloy powder) 33, a separator 34, a seal 35, a negative cap 36, an anode current collector 37, a positive cap 38, a thermally shrinkable resin tube 39, insulating rings 40 and 41, and an battery case 42.

The process according to the present invention saves the trouble of mixing up fractions of different particle sizes, has an advantage in mass productivity, and copes with diversity of requests from industry for particle sizes through fine adjustments of conditions.

The present invention will now be illustrated in greater detail with reference to Examples.

EXAMPLE 1

Molten zinc was atomized by using three nozzles (21, 22, and 23) under the following conditions.
1) Nozzle 21
   Molten metal flow rate: 0.09 kg/sec
   Cross-section of nozzle orifice: U shape
   Atomizing medium: air
   Atomizing pressure: 4.5 kg/cm²
2) Nozzle 22
   Molten metal flow rate: 0.16 kg/sec
   Cross-section of nozzle orifice: V shape
   Atomizing medium: air
   Atomizing pressure: 7.6 kg/cm²
3) Nozzle 23
   Molten metal flow rate: 0.16 kg/sec
   Cross-section of nozzle orifice: V shape
   Atomizing medium: air
   Atomizing pressure: 7.6 kg/cm²
4) Other conditions
   Molten zinc temperature (when atomized): 490–500° C.
   Angle between molten zinc stream and atomizing medium jet: 90°
   Distance between molten zinc stream and nozzle exit: 25–65 mm
   Pressure in atomizing chamber: positive pressure
   The resulting atomized zinc powder comprised 45 wt % of particles of −200 mesh and 30 wt % of particles of +80 mesh.

The process of the invention provides a zinc or zinc alloy powder comprising fine particles and coarse particles of arbitrary amounts in a good balance. The resulting zinc or zinc alloy powder has satisfactory workability in gelation to acquire a satisfactory gel viscosity, etc. and, when used in batteries, greatly contributes to excellent battery characteristics and suppresses gas evolution. The process of the invention is suited to mass production to achieve good yield.

What is claimed is:

1. A process of producing a zinc or zinc alloy powder for batteries which comprises dropping molten zinc or a molten zinc alloy to form a stream of molten metal droplets and striking a jet of an atomizing medium emitted from the orifice of a nozzle against the molten metal stream at right angles to atomize the molten zinc or the molten zinc alloy, wherein two or more said nozzles are arranged in parallel to each other, the orifice of each of said nozzles has a V-shaped, U-shaped, X-shaped or arc-shaped cross-section, said atomizing medium is air or an inert gas, two or more said molten metal streams have at least two different flow rates selected from a range of from 0.04 to 0.25 kg/sec, and two or more said jets of said atomizing medium have at least two different atomizing pressures selected from a range of from 4 to 9 kg/cm$^2$.

2. The process of producing a zinc or zinc alloy powder for batteries according to claim 1, wherein at least one of said molten metal streams has a flow rate of 0.04 kg/sec or higher and lower than 0.16 kg/sec, at least another one of said molten metal streams has a flow rate of 0.09 to 0.25 kg/sec, at least one of said jets of said atomizing medium has an atomizing pressure of 4 kg/cm$^2$ or higher and lower than 6 kg/cm$^2$, and at least another one of said jets has an atomizing pressure of 6 to 9 kg/cm$^2$.

3. The process of producing a zinc or zinc alloy powder for batteries according to claim 1, wherein said two or more nozzles have two or more orifices having different cross-sections.

4. The process of producing a zinc or zinc alloy powder for batteries according to claim 1, wherein said two or more nozzles are three or four nozzles.

5. The process of producing a zinc or zinc alloy powder for batteries according to claim 1, wherein said inert gas is nitrogen or argon.

\* \* \* \* \*